(12) United States Patent
Puckett et al.

(10) Patent No.: US 7,516,716 B2
(45) Date of Patent: Apr. 14, 2009

(54) BIRD FEEDER

(75) Inventors: Betsy P. Puckett, Foster, RI (US); Marco Wo, Providence, RI (US); James Vincent Bonnema, Middleton, MA (US)

(73) Assignee: Droll Yankees, Inc., Foster, RI (US)

( * ) Notice: Subject to any disclaimer, the term of this patent is extended or adjusted under 35 U.S.C. 154(b) by 146 days.

(21) Appl. No.: 11/484,972

(22) Filed: Jul. 12, 2006

(65) Prior Publication Data
US 2007/0227453 A1 Oct. 4, 2007

Related U.S. Application Data

(63) Continuation-in-part of application No. 11/295,917, filed on Dec. 7, 2005.

(51) Int. Cl.
*A01K 31/12* (2006.01)
(52) U.S. Cl. ...................................... 119/432; 119/462
(58) Field of Classification Search ................. 119/430, 119/432, 52.8, 57.8, 57.9, 52.3, 429, 52.2, 119/428, 458, 459, 462, 463; D30/124, 127, D30/128
See application file for complete search history.

(56) References Cited

U.S. PATENT DOCUMENTS

| | | | |
|---|---|---|---|
| 2,524,502 A | 10/1950 | Wilkinson | |
| 3,115,865 A | 12/1963 | Parkes et al. | |
| 3,244,150 A | 4/1966 | Blair | |
| 3,301,217 A | 1/1967 | Prowinsky | |
| 3,316,883 A | 5/1967 | Johnson | |
| 3,399,650 A | 9/1968 | Goodman | |
| 3,568,641 A | 3/1971 | Kilham | |
| D231,369 S | 4/1974 | Kilham | |
| D234,569 S | 3/1975 | Kilham | |
| D234,615 S | 3/1975 | Kilham | |
| D236,139 S | 7/1975 | Kilham | |
| 3,913,527 A | 10/1975 | Kilham | |
| D239,182 S | 3/1976 | Kilham | |
| D241,149 S | 8/1976 | Miller | |
| D244,098 S | 4/1977 | Kilham | |
| 4,030,451 A | 6/1977 | Miller | |
| 4,102,308 A | 7/1978 | Kilham | |
| D252,288 S | 7/1979 | Kilham | |
| D262,917 S | 2/1982 | Kilham | |
| 4,327,669 A | 5/1982 | Blasbalg | |
| 4,328,765 A | 5/1982 | Kilham | |

(Continued)

OTHER PUBLICATIONS

"Lawn Anchor" brochure, Design Life Products, Inc., Highland Park, IL 60035 (2 pgs).

(Continued)

*Primary Examiner*—T. Nguyen
(74) *Attorney, Agent, or Firm*—Salter & Michaelson

(57) ABSTRACT

A bird feeder including a container or holder for holding bird feed that has both open top and bottom ends, a plurality of feeding ports, a plurality of perches, a removable base and a manually operated latch member supported by the base. The latch member includes a plurality of latch extensions for engagement with holes in the base and a plurality of fingers for releasable engagement with the port assemblies. The feed port assembly includes a port member, an insert member for engagement with the fastener and a container for securing the port member with the insert member. A mount supports the bird feeder from below.

32 Claims, 18 Drawing Sheets

U.S. PATENT DOCUMENTS

| | | |
|---|---|---|
| D264,990 S | 6/1982 | Kilham |
| D265,921 S | 8/1982 | Kilham |
| D265,938 S | 8/1982 | Kilham |
| D265,939 S | 8/1982 | Kilham |
| 4,355,597 A | 10/1982 | Blasbalg |
| 4,361,116 A | 11/1982 | Kilham |
| D269,113 S | 5/1983 | Kilham |
| 4,434,745 A | 3/1984 | Perkins et al. |
| 4,498,423 A | 2/1985 | Gainsboro et al. |
| 4,712,512 A | 12/1987 | Schreib et al. |
| 4,829,934 A | 5/1989 | Blasbalg |
| 4,977,859 A | 12/1990 | Kilham |
| 5,016,573 A | 5/1991 | Power |
| D320,290 S | 9/1991 | Kilham |
| 5,046,699 A | 9/1991 | Perreault et al. |
| 5,062,388 A | 11/1991 | Kilham |
| 5,111,772 A | 5/1992 | Lipton |
| 5,207,180 A | 5/1993 | Graham |
| 5,215,039 A | 6/1993 | Bescherer |
| D337,244 S | 7/1993 | Kilham |
| 5,323,735 A | 6/1994 | Meng |
| D352,138 S | 11/1994 | Tucker et al. |
| 5,377,617 A | 1/1995 | Harwich |
| 5,406,908 A | 4/1995 | Burleigh |
| 5,452,682 A | 9/1995 | Bescherer et al. |
| 5,463,979 A | 11/1995 | Fasino |
| 5,465,683 A | 11/1995 | Reisdorf |
| 5,482,246 A | 1/1996 | Derkoski |
| 5,558,040 A | 9/1996 | Colwell et al. |
| D385,067 S | 10/1997 | Whittles |
| 5,699,753 A | 12/1997 | Aldridge, III |
| 5,701,841 A | 12/1997 | Fasino |
| 5,701,842 A | 12/1997 | Whittles |
| 5,732,659 A | 3/1998 | Wiggins |
| 5,791,286 A | 8/1998 | Taussig et al. |
| 5,823,541 A | 10/1998 | Dietle et al. |
| 5,829,382 A | 11/1998 | Garrison |
| D422,755 S | 4/2000 | Colwell |
| D440,361 S | 4/2001 | Colwell |
| D448,126 S | 9/2001 | Colwell |
| D452,048 S | 12/2001 | Colwell |
| 6,401,656 B1 | 6/2002 | Adkisson |
| 6,499,430 B2 | 12/2002 | Garcia-Lucio et al. |
| 6,539,892 B1 | 4/2003 | Bescherer |
| 6,543,383 B1 | 4/2003 | Cote |
| 6,647,921 B2 | 11/2003 | Stokes et al. |
| 6,701,867 B1 | 3/2004 | Garrison |
| 6,715,503 B2 | 4/2004 | Brooks, III |
| 6,758,164 B2 | 7/2004 | Rich |
| 6,957,626 B2 | 10/2005 | Ela et al. |
| 7,111,582 B2 * | 9/2006 | Rich .................. 119/57.8 |
| 2004/0031443 A1 | 2/2004 | Ela et al. |
| 2005/0211177 A1 | 9/2005 | Bescherer |

OTHER PUBLICATIONS

Droll Yankees, "Extending the Sanctuary Series . . . ".
Aspects Brochure "Songbird Select".
Duncraft, Winter & Holidays 1999 "Specialties for Enjoying Wild Birds," Penacook, NH, pp. 1-48.
Droll Yankees, "Droll Yankees Bird Feeders," Foster, RI, pp. 1-19.

* cited by examiner

BIRD FEEDER

RELATED APPLICATION

This application is a continuation-in-part of application Ser. No. 11/295,917 filed Dec. 7, 2005.

TECHNICAL FIELD

The present invention relates, in general, to a bird feeder, and pertains more particularly to a bird feeder having a removable base and an improved feed port assembly. The present invention also relates to an improved mount for a bird feeder.

BACKGROUND OF THE INVENTION

The typical bird feeder on the market has the base firmly attached to the bird feeder container. This makes it difficult to clean the bottom end of the container housing. Another difficulty with bird feeders currently on the market is that the feed port assemblies have to be connected internally thus requiring a complex connecting arrangement between respective feed port assemblies. Existing arrangements also do not lend themselves to disposing feed port assemblies in random locations of the container and are generally limited to being disposed in the same plane.

Accordingly, it is an object of the present invention to provide a bird feeder with a removable or releasable base so as to facilitate cleaning of both the base and the lower end of the bird feeder container or housing.

Another object of the present invention is to provide a removable base for a bird feeder in which the base is held relatively firmly in place in its closed position and yet is relatively easy for the user to remove from the container housing.

Still another object of the present invention is to provide a bird feeder with a removable base in which the base can be readily removed by a user but that is not able to be removed by an animal such as a squirrel.

Another object of the present invention is to provide a base that may be easily assembled.

Still another object of the present invention is to provide feed port assemblies that are constructed so that they can be arranged in different positions or planes of the feeder.

Another object of the present invention is to provide a feed port assembly that does not require support from adjacent port assemblies.

Another object of the present invention is to provide a feed port assembly that is secured in and of itself to the container and/or base.

Still another object of the present invention is to provide an improved mount for a bird feeder.

SUMMARY OF THE INVENTION

In accordance with the foregoing and other objects, features and advantages of the invention there is provided a bird feeder that is comprised of a bird feed holder or container having open top and bottom ends, a plurality of feeding ports disposed in a sidewall defining the holder, a plurality of perches each associated with an inlet of an associated feeding port and a removable base for engaging with the bottom end of the holder. The removable base has a sealed position for sealing the bottom end of the holder so as to retain the bird feed therein and a released position in which the base is removed from the holder to enable access to the bottom end of the holder. The bird feeder further includes a manually operated latch member supported for engagement so as to enable releasable securing of the removable base to the holder. The latch member further includes means for supporting the latch member from the base including at least one latch extension for releasable engagement with a slot in a top wall of the base.

In accordance with further aspects of the present invention the open top may have a cover to seal the top end; the bottom end may be removably sealed to the base assembly; the plurality of perches may be independently supported on the container or holder; the latch member may radially engage with the holder; the plurality of latch extensions may be symmetrically disposed about the latch member; and the latch extension may have an engaging end lip.

In accordance with another embodiment of the present invention there is provided a bird feeder comprising a container for bird feed and at least one feed port assembly. The container includes a walled member having at least one opening for receiving the feed port assembly. The feed port assembly includes a port member that supports a perch for holding a bird, an insert member having a slot for engagement with the walled member at the opening and a fastener for securing the port member with the insert member so that the feed port assembly is fixed to the container.

In accordance with further aspects of this embodiment of the present invention, the bird feeder may include a plurality of feed port assemblies which may be disposed at random locations on the container; the container may have a removable base; the perch may be arcuate in shape and may have opposed legs and the removable base may have respective notches for receiving the legs. The port member may have a hood for preventing the outflow of bird seed.

In accordance with still another embodiment of the present invention there is provided a bird feeder comprising a container for bird feed, and at least one feed port assembly. The container includes a walled member having at least one opening for receiving said feed port assembly. The feed port assembly includes a port member, an insert member for engagement with the walled member at the opening and a fastener for securing the port member with the insert member so that the feed port assembly is fixed to the container.

In accordance with further aspects of this embodiment of the present invention, the port member and insert member may have respective interlocking cooperative surfaces preventing relative rotation therebetween. The respective interlocking cooperative surfaces may comprise a groove and tongue arrangement. The bird feeder may have a perch that is arcuate in shape with opposed legs and the container may further include a removable base which may have notches for receiving the respective legs. The insert member may have a slot for engagement with the walled member. Furthermore, the port member may include an outer collar and an inwardly directed hood, and the fastener may extend through the collar for secure engagement with the insert member.

In accordance with a further embodiment of the present invention there is provided a support system for a bird feeder that is comprised of a pole member for supporting the bird feeder from a top end thereof and a clamp member adapted for positioning about the pole member and including an upward jaw member and a lower jaw member with each of the upper and lower jaw members being adjustably spaced apart and for having positioned therebetween a support rail or the like. A support block is supported by one of the jaws. Means are provided for tightening the support block toward the other jaw to tighten the clamp member about the rail.

In accordance with further aspects of the present invention the lower jaw member may have an open chamber for receiving the block and the block may have a series of nubs thereon; the means for tightening may include a hook member that engages with the block from below and moves the block relative to the lower jaw and each of the jaw members may include a collar for fitting about the pole member and a base with the upper jaw base receiving a screw or the like to secure the clamp member to the rail.

BRIEF DESCRIPTION OF THE DRAWINGS

Numerous other objects, features and advantages of the present invention should now become apparent upon a reading of the following detailed description taken in conjunction with the accompanying drawings, in which.

DETAILED DESCRIPTION OF THE DRAWINGS

Figure 1:
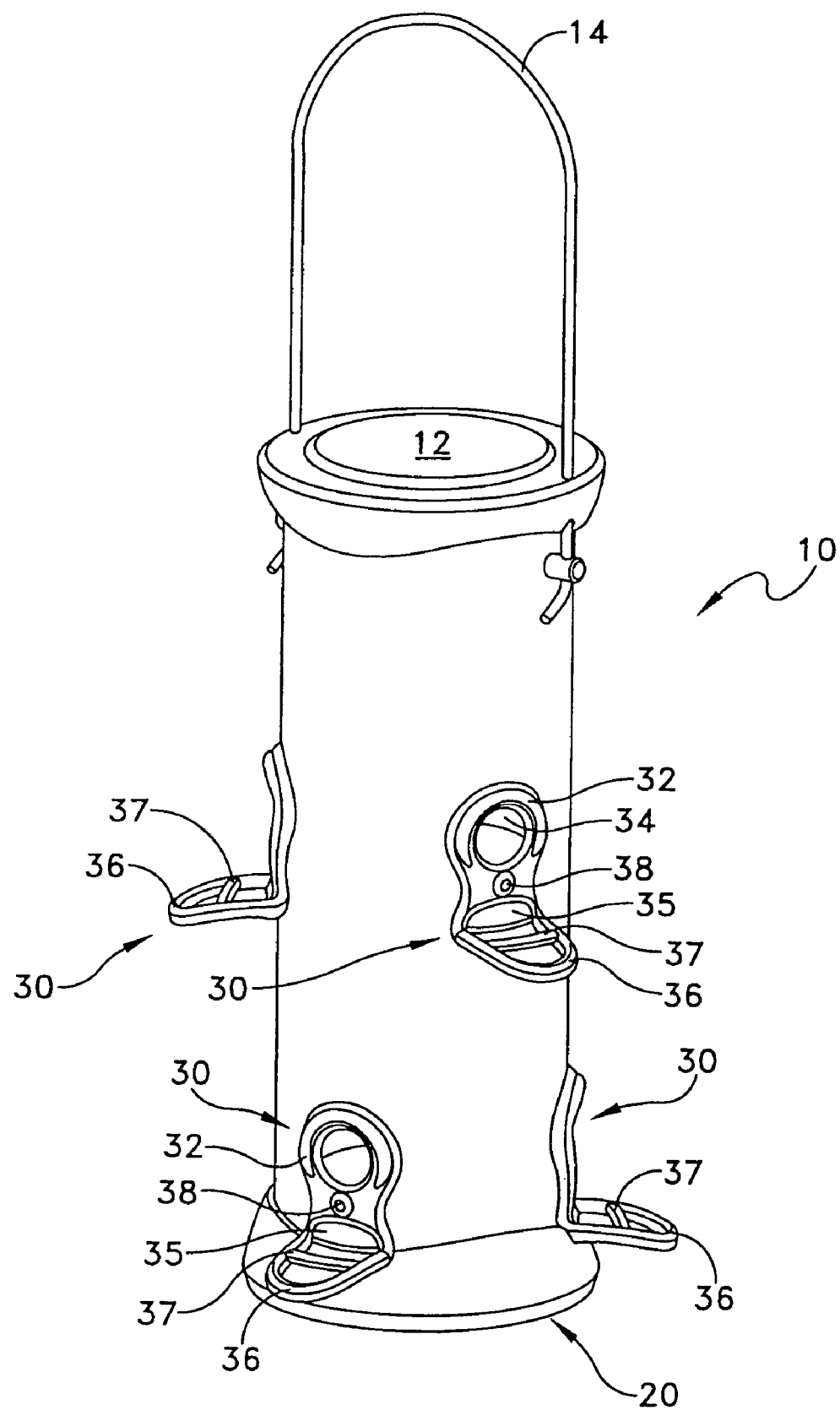
FIG. 1 is a perspective view of one embodiment of the bird feeder of the present invention.
Figure 2:
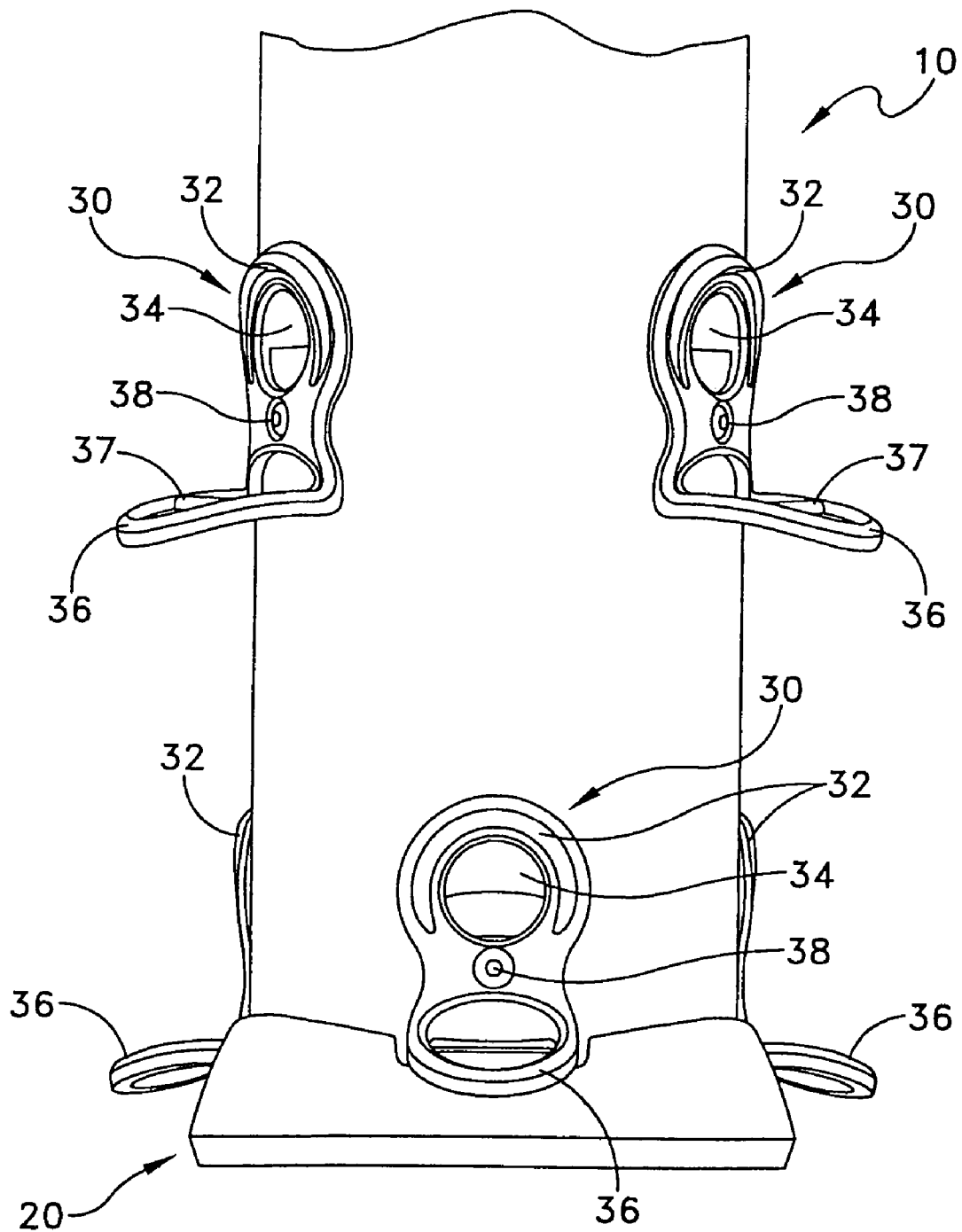
FIG. 2 is a front elevation view of the bird feeder of FIG. 1.

Referring now to the drawings, a preferred embodiment of the present invention is illustrated in FIGS. 1-14. The bird feeder includes a container or holder 10 for the bird feed; a removable or releasable base assembly 20; and a plurality of feed port assemblies 30.

Reference is now made to FIG. 1 which is a perspective view of a bird feeder constructed in accordance with the principles of the present invention. This feeder includes a container or holder 10 that is preferably constructed of a clear plastic material. The container 10 holds the bird seed or other type of bird feed. The container 10 is open at its top and bottom. A top or cover 12 is supported over the top end of the container 10. The top or cover 12 may be supported on a bale wire 14 that enables the cover 12 to be slid up and down the wire. The cover 12 is moved upwardly for the purpose of introducing seeds into the container and is illustrated in FIG. 1 in its bottom closed position.

Figure 3:
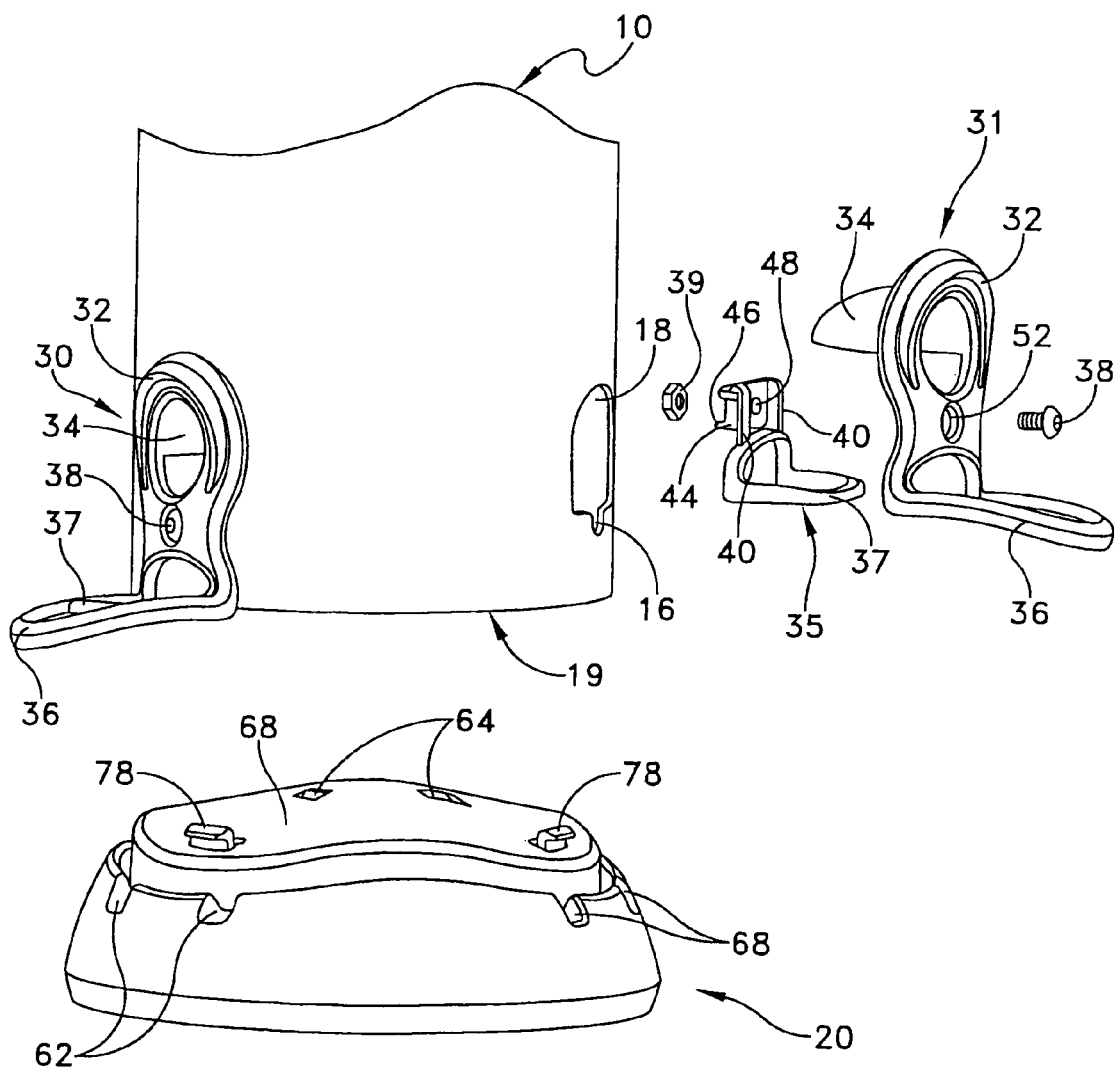
FIG. 3 is an exploded perspective view showing the components at the base of the bird feeder.
Figure 6:
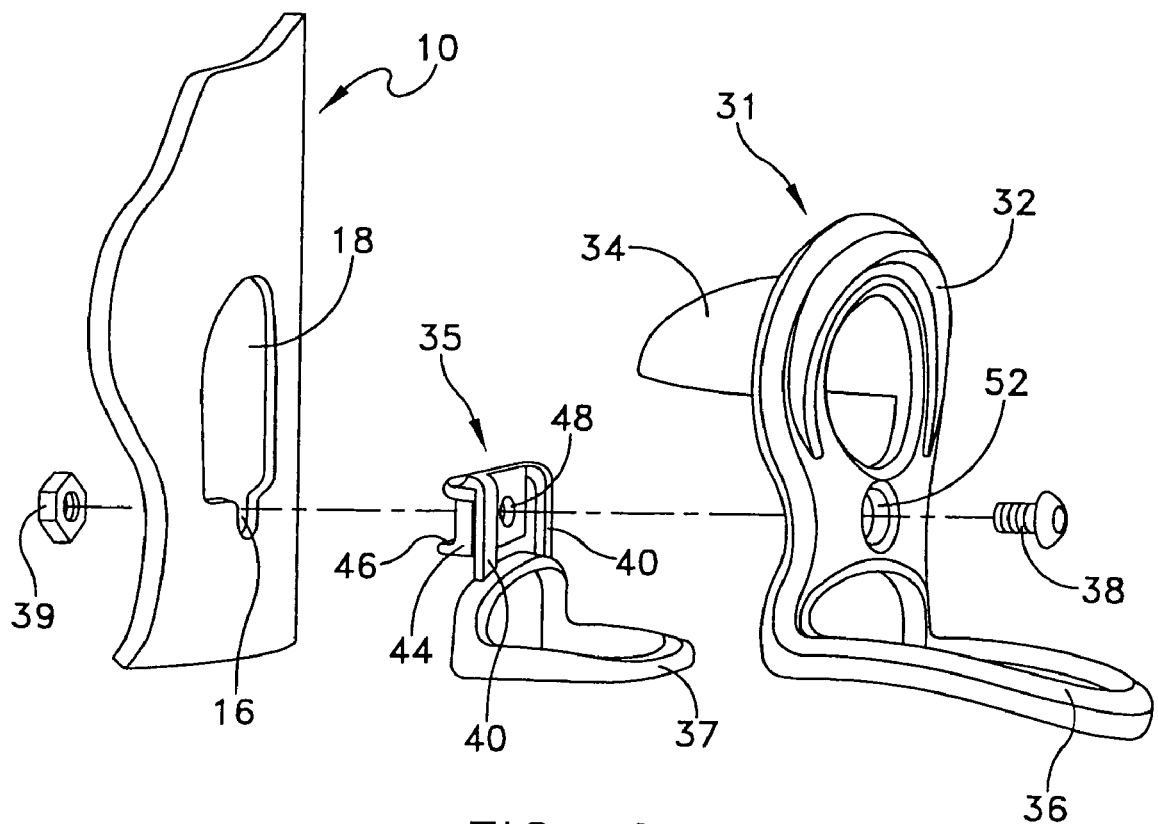
FIG. 6 is an exploded perspective view of the feed port assembly as illustrated in FIG. 3.

The container, as illustrated in detail in FIGS. 1-3 and 6, includes a plurality of openings 18. Each of the openings 18 is structured so as to receive each of the feed port assemblies 30, as illustrated in further detail in FIGS. 3 and 6. Each opening 18 has a slot 16 which is for receiving the bolt 38, as also illustrated in FIGS. 3 and 6. This slot enables the bolt 38 to pass through and be tightened with nut 39. The nut 39 is preferably affixed to the insert member 35 so that it does not have to be held separately during installation. The insert member 35 may be provided with a hexagonally-shaped recess for receiving the nut 39.

The bottom 19 of the container 10 is open so as to enable fastening to the base assembly 20, as will be discussed in further detail hereinafter. The open bottom 19 of the container 10 is shown in its sealed position in FIGS. 1 and 2; and is illustrated in its open, or released position in FIG. 3, which enables the base to be easily cleaned.

Each of the feed port assemblies 30 disposed on container 10, as illustrated in further detail in FIGS. 3 and 6-11, includes a port member 31 and an insert member 35. These members 31 and 35 are cooperatively supported in a manner so that no additional support or securing means, other than a single fastener, is necessary in order to properly affix the port assembly to the container. Moreover, this single fastener need not be secured directly with the cylindrical container.

Figure 11:
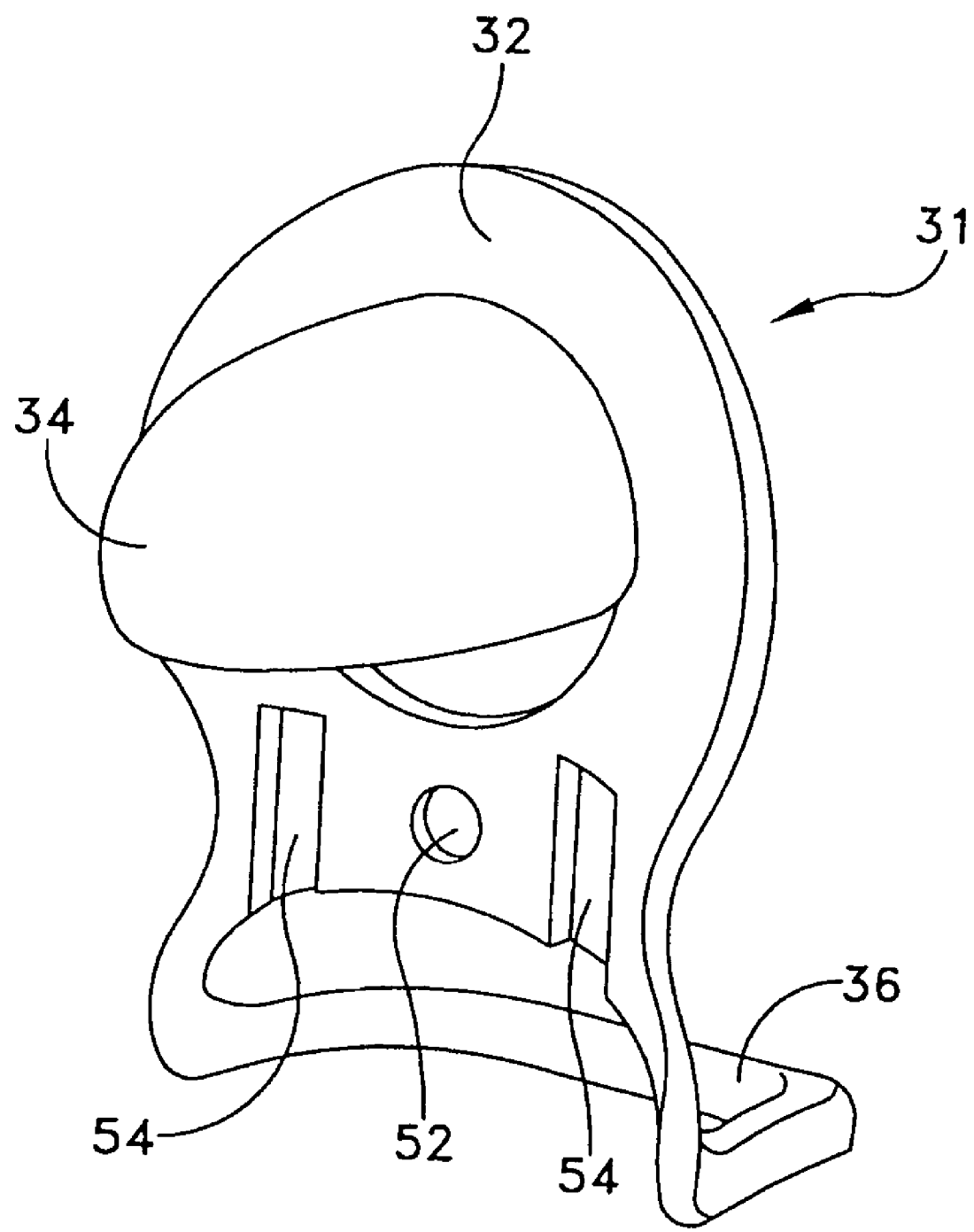
FIG. 11 is a perspective view of the port member of the port assembly as illustrated in FIGS. 1-3.

The port member 31 is illustrated in further detail in FIGS. 3, 6 and 11 and may be constructed as a single piece structure of a plastic or lightweight metal material. The member 31 includes a collar 32; a hood 34; a hole 52; a pair of grooves 54; and a perch 36 for a bird to rest on. The inner surface of the collar 32 is contoured so as to match the cylindrical shape of container 10. The hood 34 is constructed so as to prevent the outflow of feed from the container 10. The hole 52 is for receiving the bolt 38, as illustrated in FIG. 6.

Figure 7:
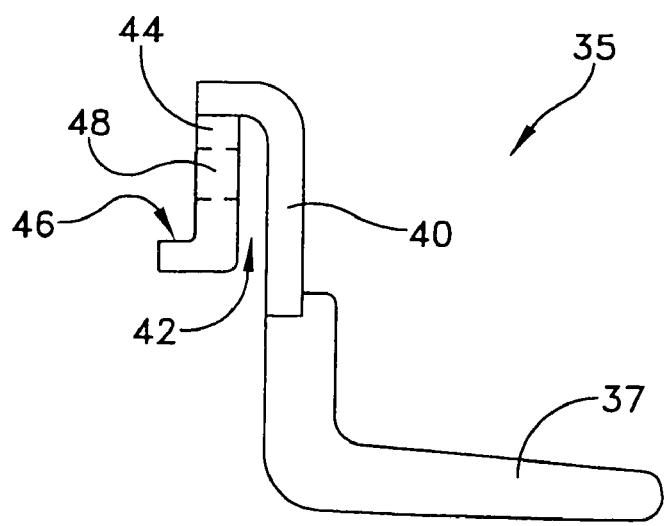
FIG. 7 is a side elevation view of the insert member as illustrated in FIGS. 1-3.
Figure 8:
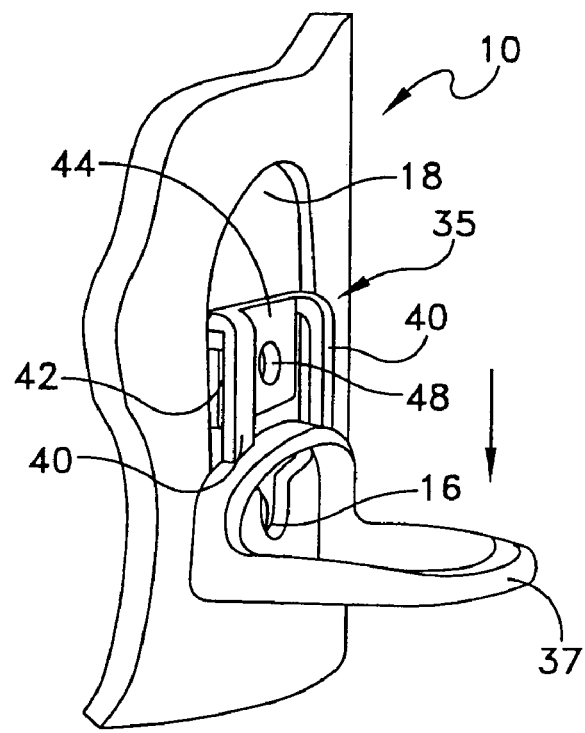
FIG. 8 is a perspective view of the insert member just before engaging with the container as illustrated in FIG. 6.
Figure 9:
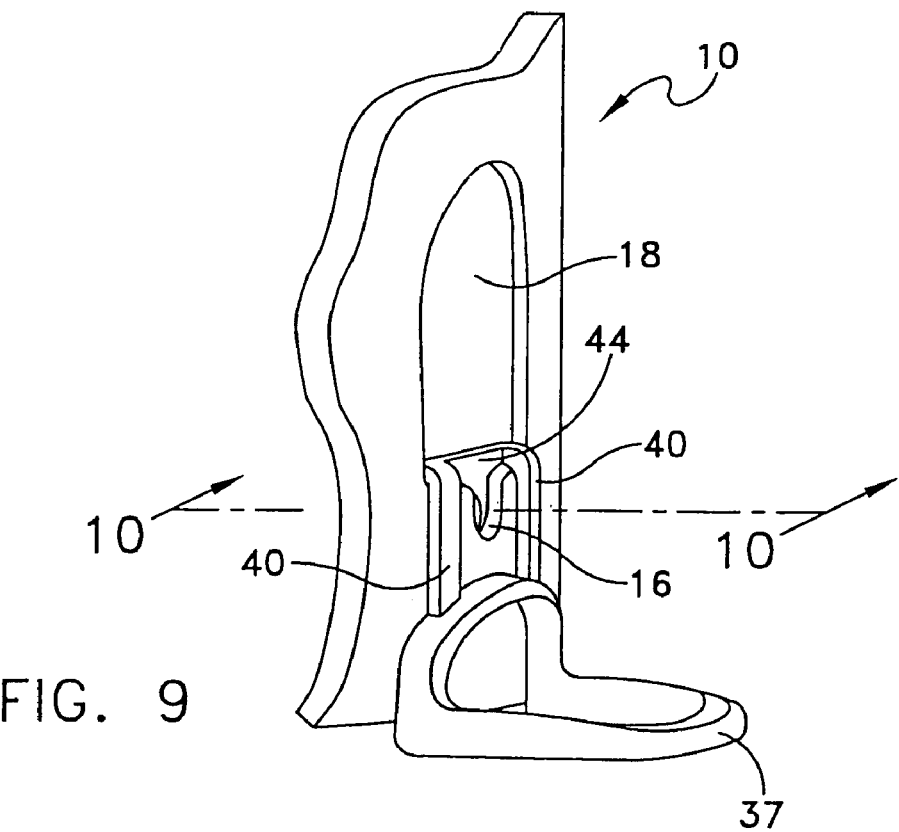
FIG. 9 is a perspective view of the insert member engaging with the container as illustrated in FIG. 6.
Figure 10:
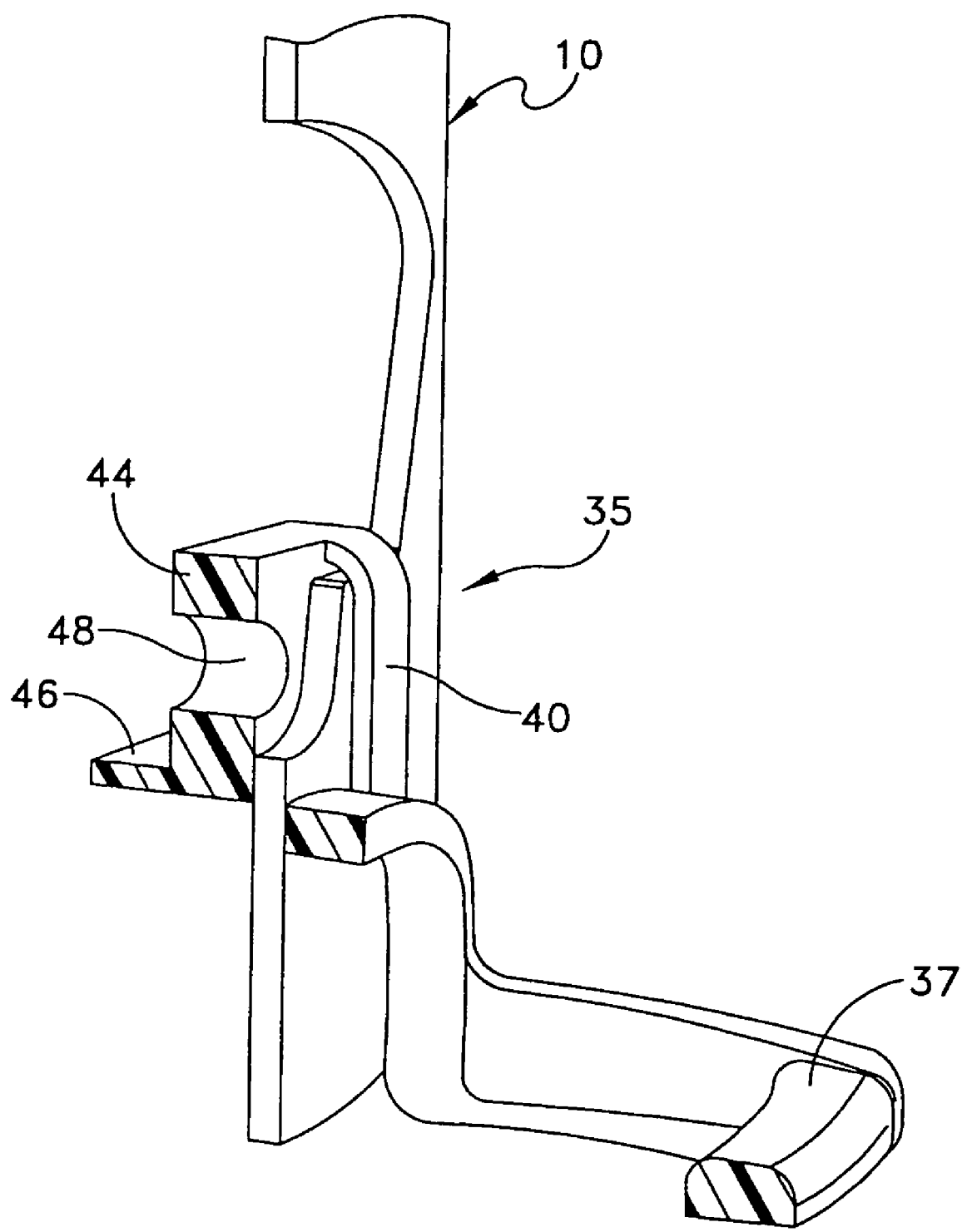
FIG. 10 is a fragmentary perspective cross-sectional view of the insert member engaging with the container as illustrated in FIG. 7.

The insert member 35 is illustrated in further detail in FIGS. 3, 6, 7 and 10 and may be constructed as a single piece structure of a plastic or lightweight metal material. The insert member 35, as depicted in FIG. 7, includes a perch or support 37 which is smaller than perch 36; a pair of legs or tongues 40; a support wall 44; a hole 48; a ridge 46, that extends from the lower end of the wall 44, and a slot 42 (see FIG. 7). The slot 42 is defined between wall 44 and legs or tongues 40. The pair of legs or tongues 40 is for interlocking with the grooves 54 of the port member 31 to prevent relative rotation therebetween. The hole 48 is for receiving the bolt 38 as illustrated in FIG. 6. The ridge 46 is meant for engagement with the base assembly 20 so as to lock the base in place, as illustrated in further detail in FIGS. 5 and 14 and will be discussed in further detail hereinafter. The insert member slot 42 is for engaging with the sidewall that defines the container 10, as illustrated in FIGS. 8 and 9. FIG. 8 illustrates the insert member inserted in the opening 18 with the insert about to be engaged with its slot 42 to the container 10. FIG. 9 shows the completed engagement of the insert member 35 with the container wall. FIG. 10 shows a cross-sectional view of the insert member 35 as engaged with the side wall of container 10.

Figure 5:
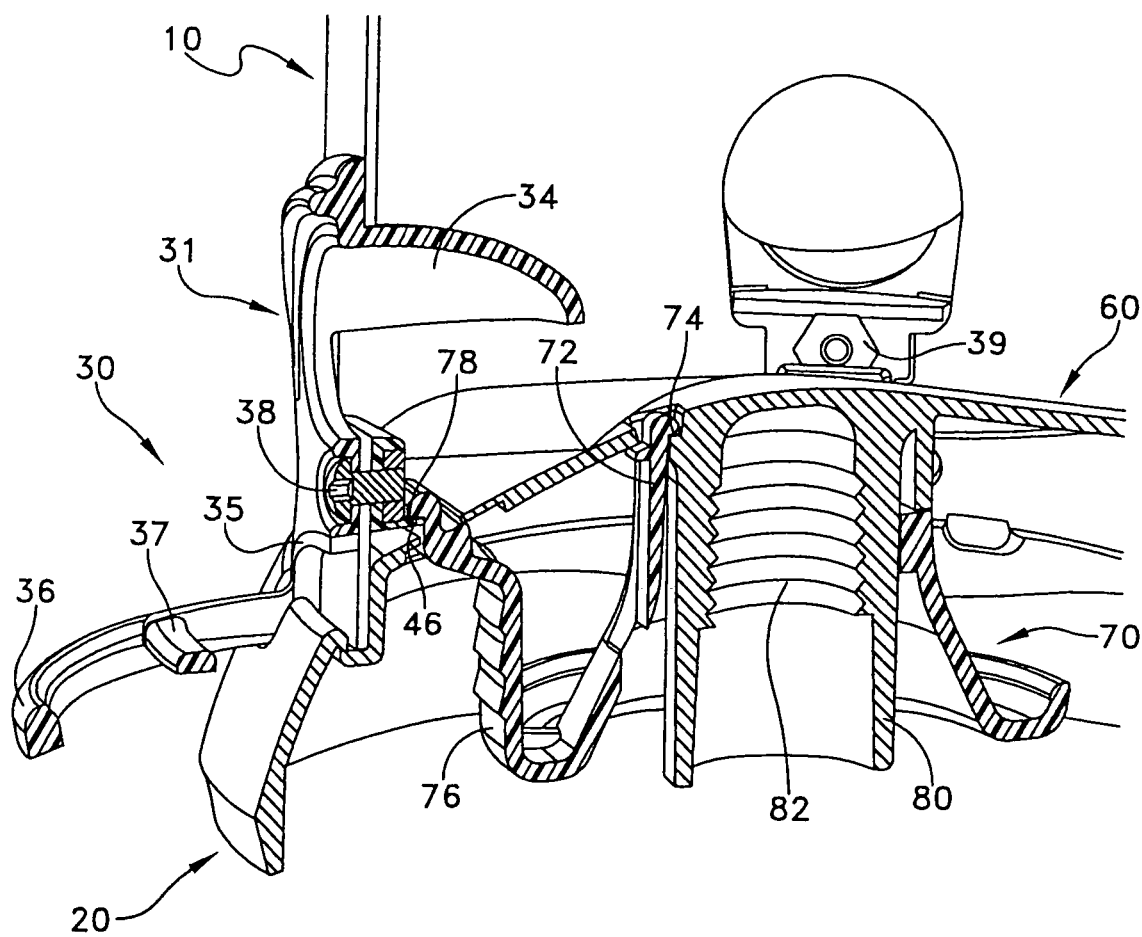
FIG. 5 is a fragmentary perspective cross-sectional view of the base assembly as engaging with the container as taken along line 5-5 of FIG. 4.

Once the insert member 35 is placed in its position on the container then the port member 31 is inserted from the outside in through the opening 18 to the position illustrated in FIG. 5. This feed port assembly 30 of members 31 and 35 is held in place by a bolt 38 and a nut 39. The holes 52 and 48 for the port member 31 and insert member 35, respectively, allow the bolt 38 to pass through and thus clamp the port assembly together once fastened with nut 39. The combination of the bolt 38 and the interlocking of the insert member 35 via slot 42 secures the entire port assembly in place.

One major advantage of this feed port assembly 30 is that it is capable of being placed at random positions on the container 10 without having to connect the assemblies inside of the container 10, as it is independently fastened. When the port assembly 30 is assembled, the two perches 36 and 37 together form a dual perch, creating an "A-shaped" perch, ideal for birds of various sizes. Furthermore, the shorter perch 37 could be, alternatively, designed so as to fit under the larger perch 36 to provide additional support for the longer perch.

Figure 12:
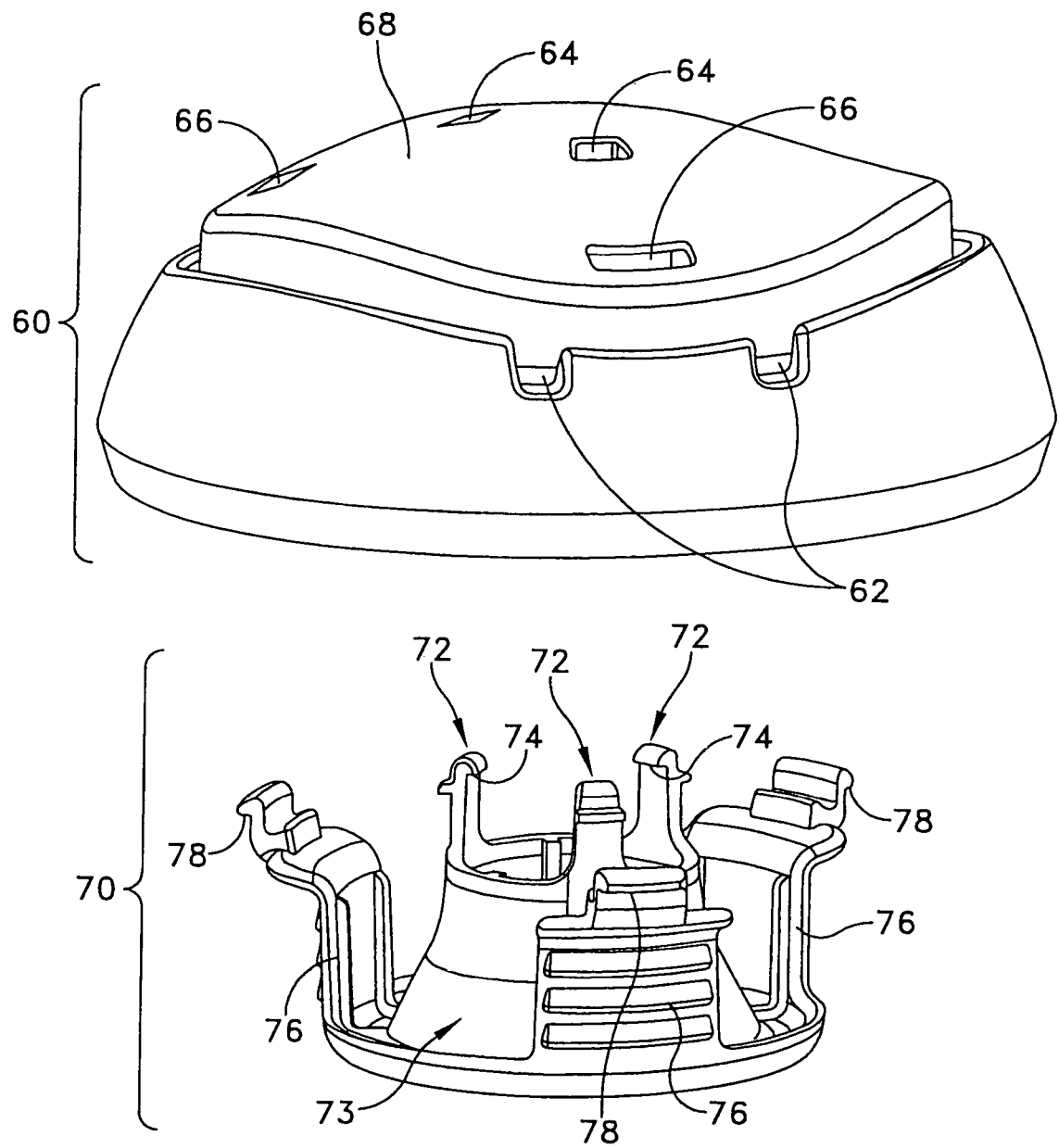
FIG. 12 is an exploded perspective view showing the components of the base assembly.
Figure 13:
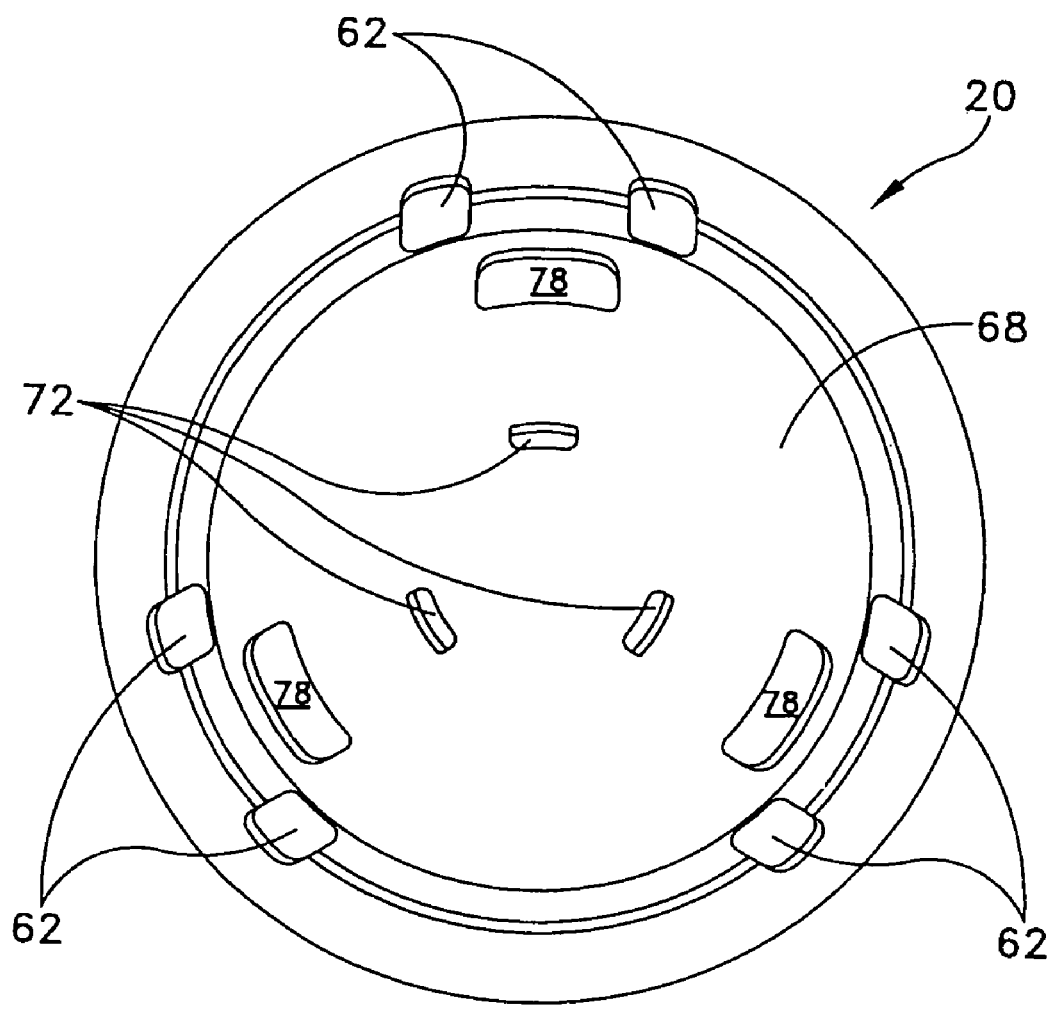
FIG. 13 is a top view at the base assembly of the invention as illustrated in FIGS. 1-3.

The base assembly 20, as illustrated in FIGS. 3-5, 12 and 13, includes a base member 60 and a latch member 70. FIG. 12 illustrates the base assembly 20 before the base member 60 and latch member 70 are locked together. FIGS. 3 and 13 illustrate the base assembly 20 once the base member 60 and the latch member 70 are locked together.

The base member 60, as illustrated in further detail in FIGS. 12 and 13, includes a plurality of slots 62 for holding the port assemblies 30; a plurality of locking holes 64 located on the top wall or dome 68 to internally lock the base member 60 and latch member 70 together; and a plurality of holes 66 also located on the top wall or dome 68, which allow the fingers 76 of the latch member to pass through and engage with each of the port assemblies 30, as discussed in further detail hereinafter.

The latch member 70, as illustrated in further detail in FIG. 12 includes a plurality of extensions 72 symmetrically disposed from center support 73. Each of the extensions 72 has, at its free end, a lip 74 which engages with the locking holes 64 in the top wall 68 of the base member 60 to lock the latch member 70 into the base member 60. This latching arrangement eliminates the need for any screws or another method of fastening the base components together. In this way the latch member can be securely attached to the base member 60 but also can be readily released by engaging and deflecting the lips 74 over the dome.

The latch member 70 also includes a plurality of fingers 76 that each has a lip 78 at its top free end which extend through the releasable holes 66 in the top wall 68 of the base member 60 and engage with the ridge 46 of the feed port assemblies 30. Each of the fingers 76 is flexible so that they can be readily deflected, in tandem, in order to release the base assembly 20 from the container 10. Each of the fingers is pressed radially inward to release. However the fingers 76 are also sturdy once locked into position so that the base assembly 20 is sealed to the container 10. The fingers 76 are locked by means of each of the fingers 76 engaging with the ridge 46 of the port assemblies 30. The fingers 76 are generally biased outward to interlock with each of the port assemblies 30, and when the fingers 76 are manually depressed inward, it goes against the normal bias to release the base assembly 20. Once depressed inwardly, the lips can be cleared of their associated ridge 46.

Figure 4:
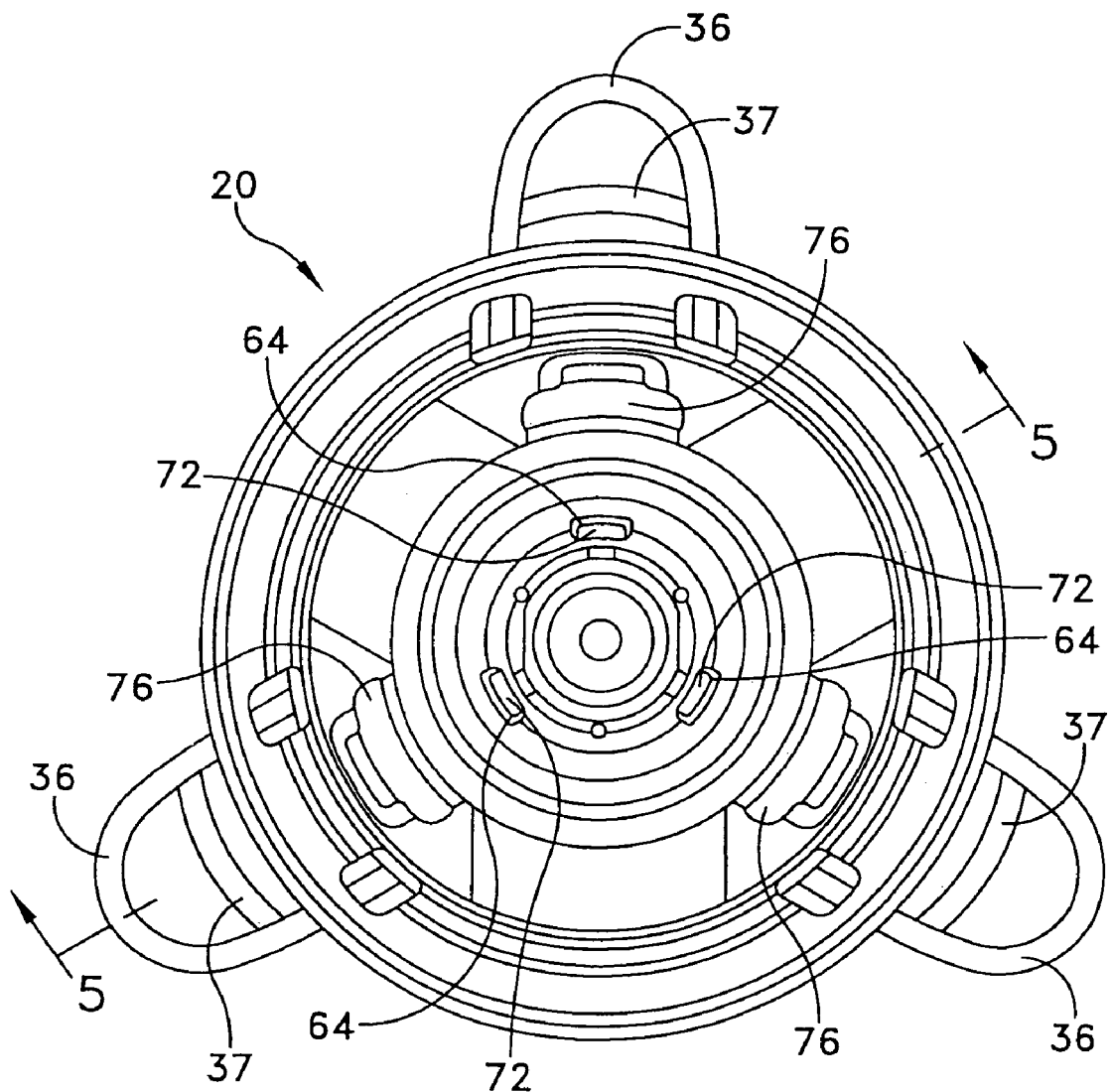
FIG. 4 is a bottom view at the base assembly of the bird feeder as disclosed in FIG. 1.

FIG. 4 illustrates the base assembly 20 once the latch member 70 and base member 60 are locked together and assembled to the container 10; as viewed from the bottom. The extensions 72, as viewed from the bottom, have engaged with the locking holes 64 in the top wall 68 and are shown in the locked position. The fingers 76, as also viewed from the bottom, have passed through the holes 66 in the top wall 68 and engaged with the container 10, more specifically the fingers 76 have engaged with ridges 46 of the port assemblies 30 to lock the base assembly 20 and container 10 together. The perches 37 and 36 are also shown in FIG. 4.

FIG. 5 is a fragmentary perspective cross-sectional view of the base assembly as engaging with the container as taken along line 5-5 of FIG. 4. As previously stated, FIG. 5 illustrates the engagement of the container 10 with the base; more specifically the engagement of each of the port assemblies 30 with the base assembly 20. The lip 78 of finger 76 engages with the ridge 46 of the insert member 35 to lock the port assembly 30 into place. The base assembly 20 is fully engaged with the container 10 when all of the fingers 76 have engaged with all of the respective ridges 46 of the port assemblies 30. In this regard, three fingers 76 are shown in FIG. 12, however, more or fewer than these may be used.

Figure 14:
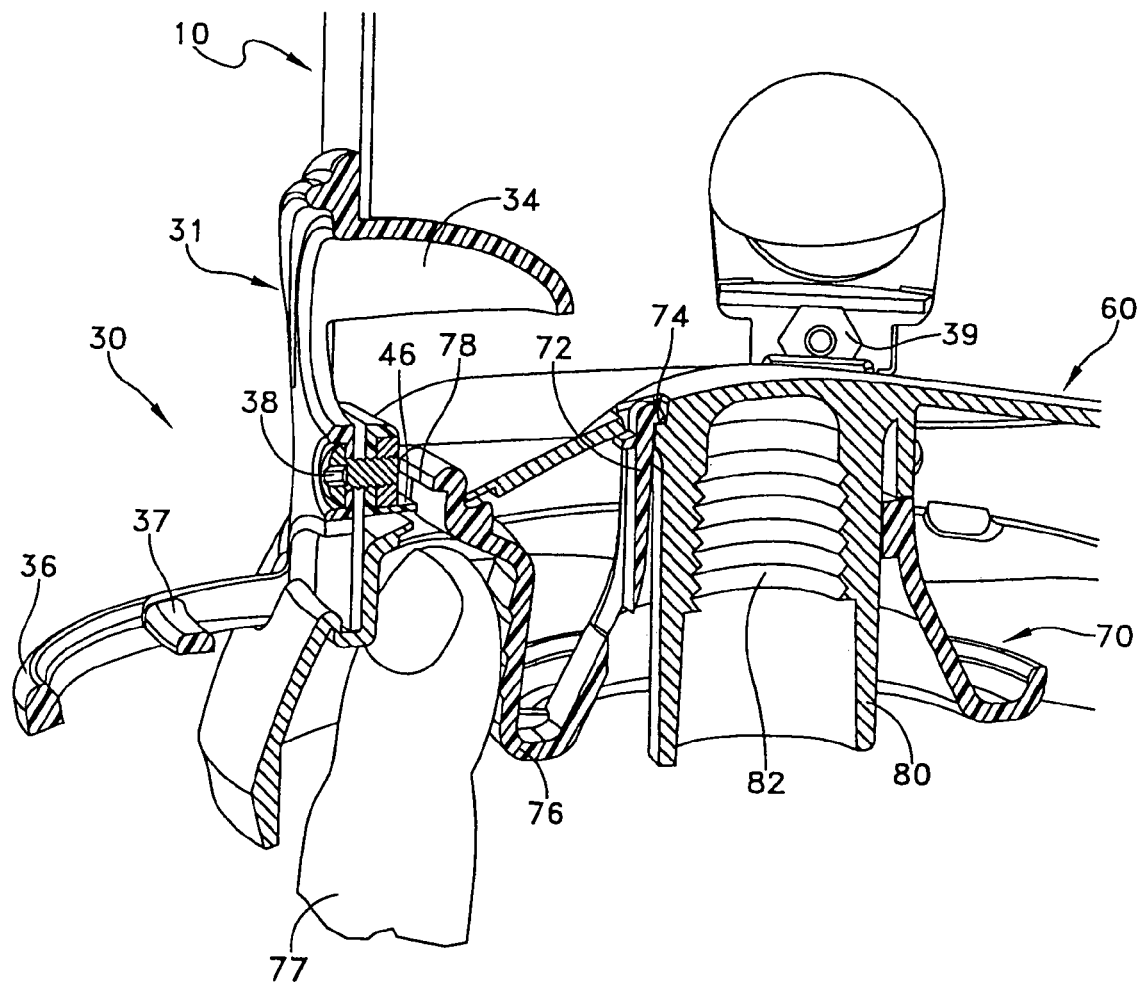
FIG. 14 is a fragmentary perspective cross-sectional view of the base assembly like that described in FIG. 5 but illustrating the disengagement with the container.

As illustrated in FIG. 14, the fingers 76 may be manually pressed inward simultaneously with a thumb or digit 77 so as to go against the normal radially outward bias of the fingers 76. This is done when it is desired to remove the base assembly 20 from the container 10. FIG. 5 illustrates the engaging of the lip 78 with the ridge 46 so as to lock it into place. FIG. 14 illustrates the thumb or digit 77 disengaging the lip 78 from the ridge 46. The holes 66 are wide enough to allow this deflection of the lip 78.

The base assembly has disposed, as illustrated in FIGS. 5 and 14, an integral center shaft 80 having internal threads 82 for a receiving post or other means for alternatively securing the bird feeder from the bottom instead of from the top. For a bottom support arrangement, refer to co-pending application Ser. No. 11/295,917, filed Dec. 7, 2005, and in particular FIGS. 38-40 thereof, the contents of which is hereby incorporated by reference in its entirety.

Reference is now made to FIGS. 15-22 for an illustration of a support apparatus that may be used with the embodiment illustrated hereinbefore in FIGS. 1-14. In, for example, FIG. 1 the bird feeder is provided with a hanger so that the feeder can be supported from above. In an alternate embodiment of the invention, the bird feeder may be supported from its base by means of an apparatus such as shown in FIGS. 15-22. For that purpose the feeder is preferably provided with a receiving post at its base that is internally threaded as depicted, for example, in FIG. 14 at 82.

Figure 15:
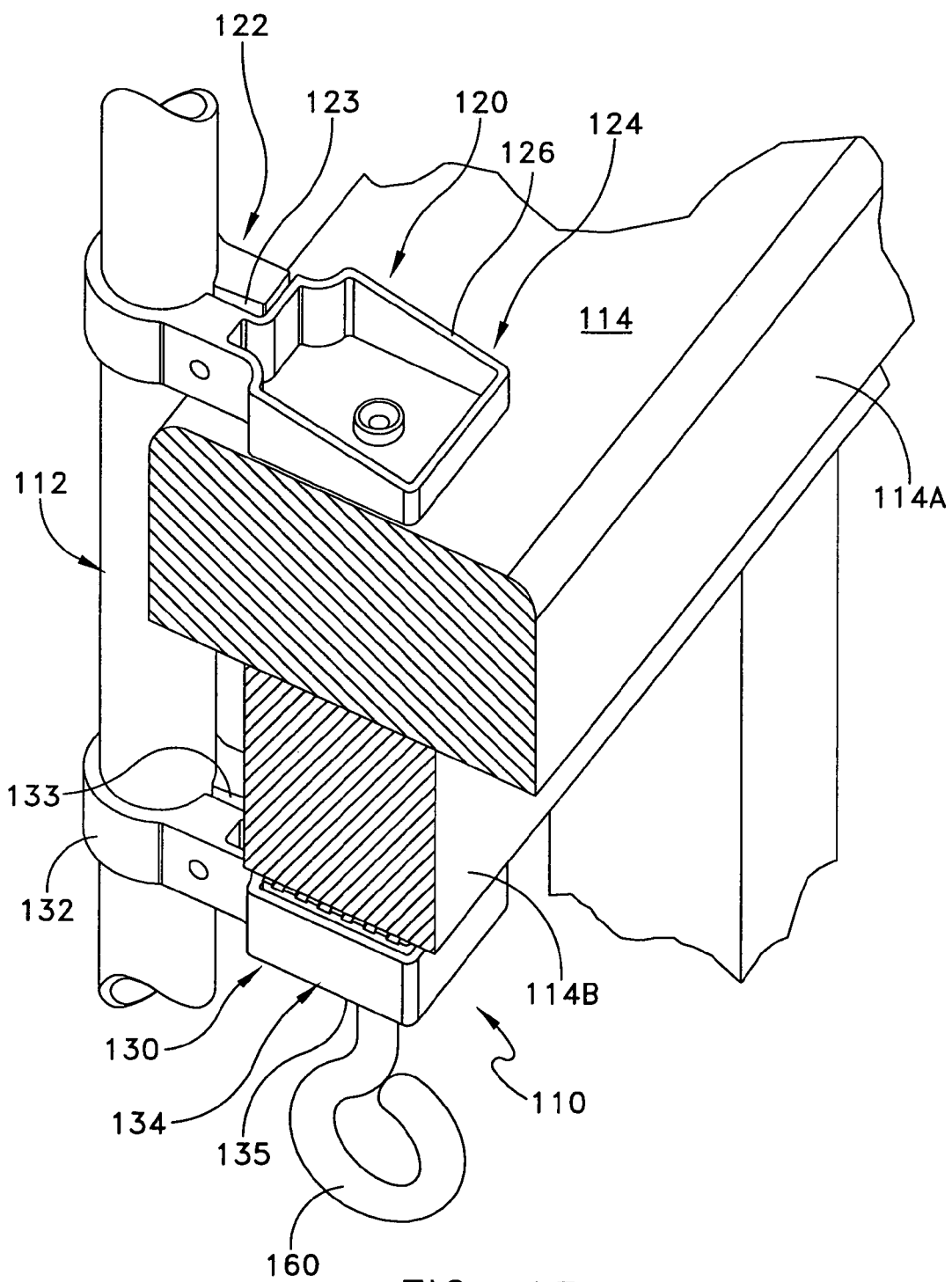
FIG. 15 is a perspective view of a support apparatus for a bird feeder in accordance with the present invention.
Figure 16:
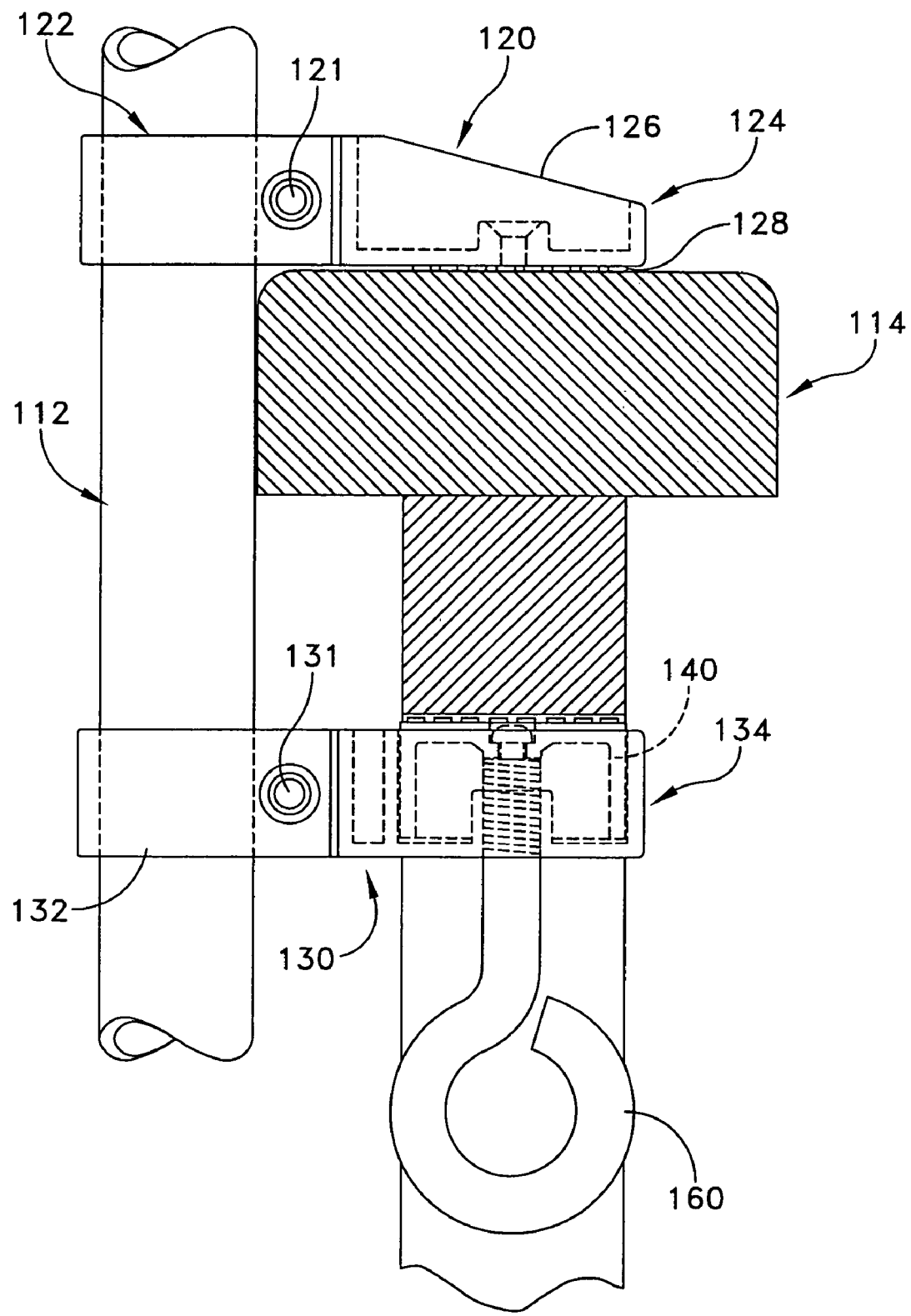
FIG. 16 is a cross-sectional; side view illustrating the manner in which the support apparatus is engaged with a rail.

The support apparatus that is depicted in FIG. 15 basically includes a clamp member 110 and a support pole 112. The very top of the pole 112 may be threaded (not shown) so as to mate with an internally threaded member such as depicted in FIG. 14 at 82. This provides support of the bird feeder from and above the rail 114. The rail 114 may be part of a support rail that typically extends about a deck or the like. In FIG. 15 the rail is shown as of two parts 114A and 114B. These parts are usually of wood construction. The pole 112 may be constructed of a metal or plastic material and is preferably tubular in cross-section. The pole 112 is adapted to be readily positioned at different heights so as to likewise position the bird feeder at different heights.

The clamp member 110 is formed in two parts including upper jaw 120 and lower jaw 130. Each of these jaws may be independently adjusted on the pole 112 so as to fit about rails of different height. The jaws 120 and 130 may be constructed of a metal or plastic material but are preferably constructed of a relatively light weight metal material such as zinc or aluminum.

Figure 17:
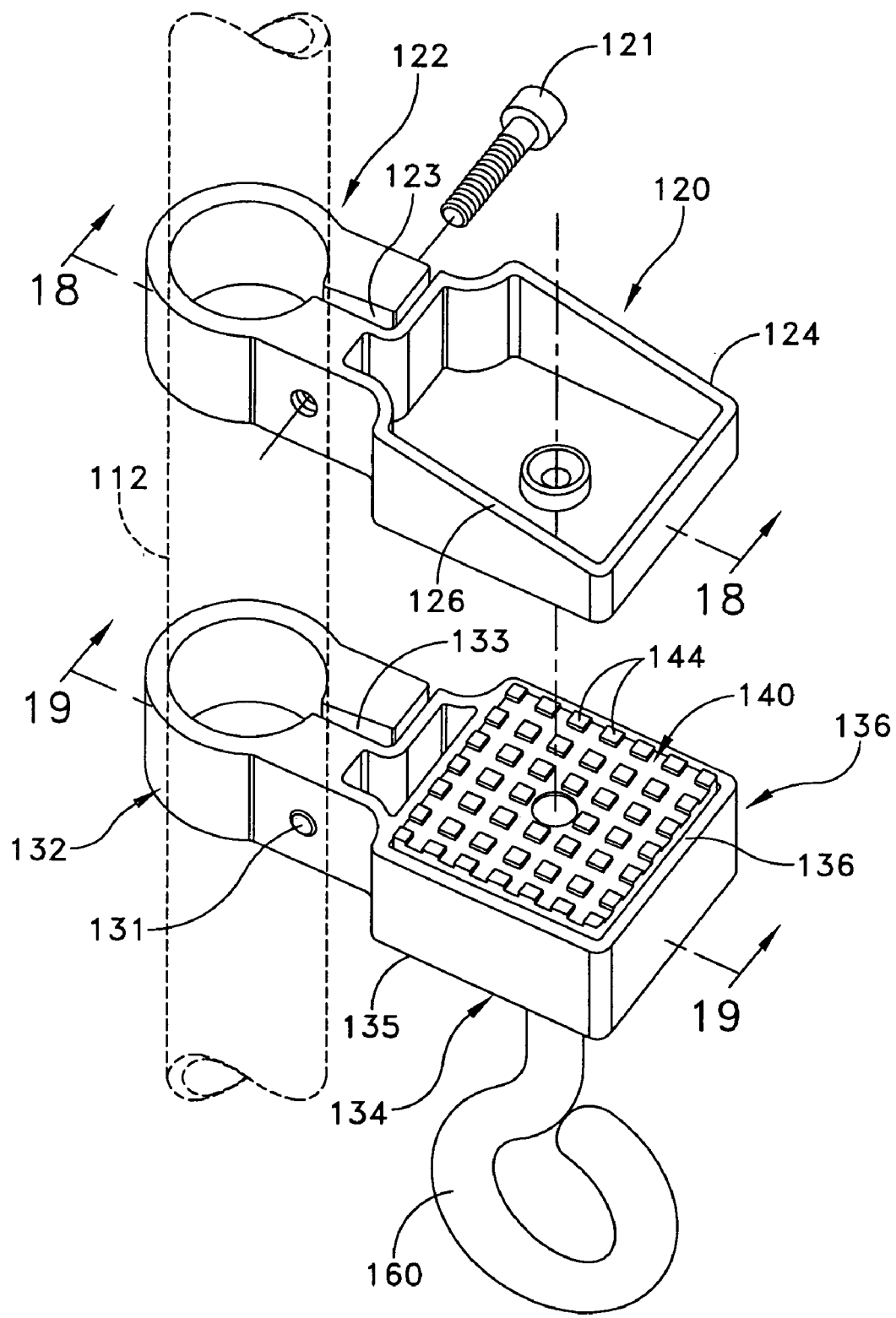
FIG. 17 is an exploded perspective view of the clamp member as attached to a support pole.
Figure 18:
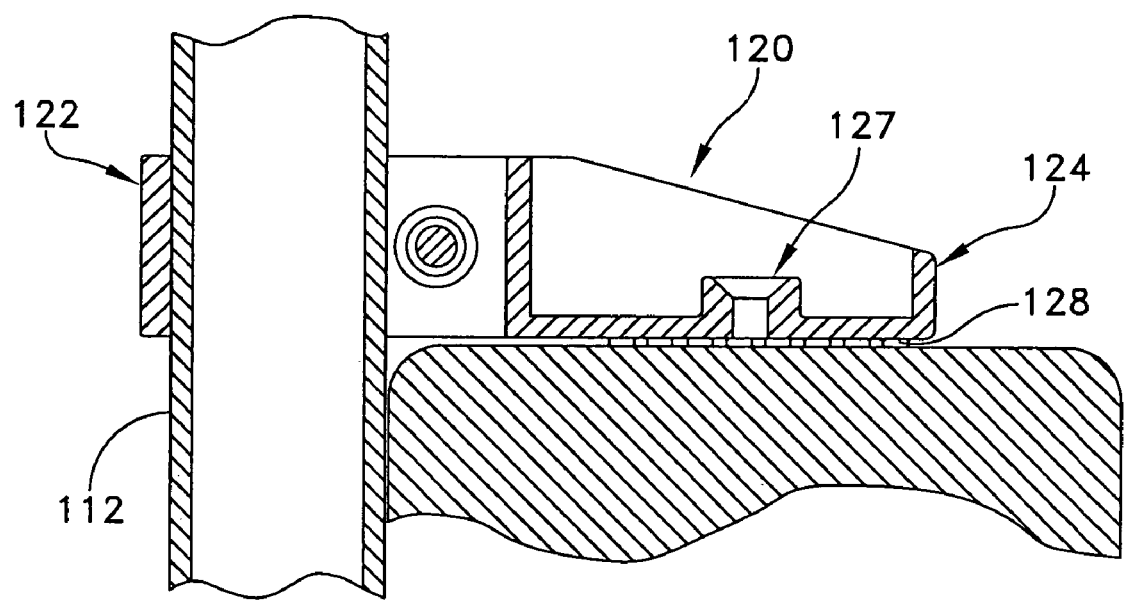
FIG. 18 is a cross-sectional view as taken along line 18-18 of FIG. 17 view showing further details.
Figure 20:
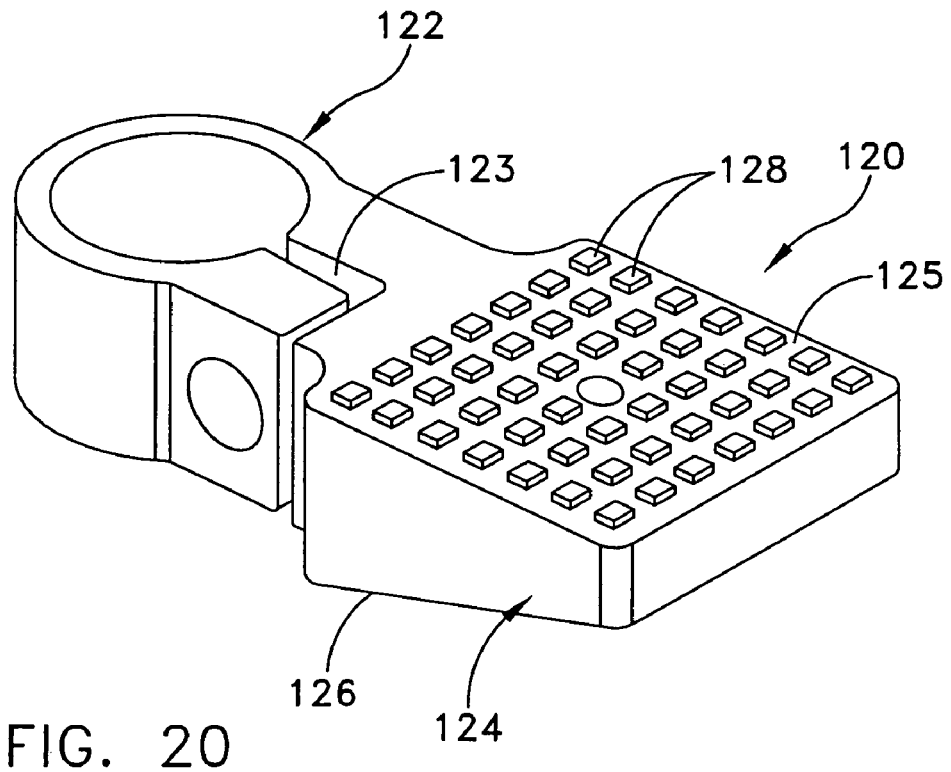
FIG. 20 is a perspective view of the underside of the upper jaw of the clamp member.

The lower jaw 130 has a hook member 160 used to tighten and loosen the clamp member once it is in place. The upper jaw 120 includes a collar 122 and a base 124, such as is depicted in FIGS. 15 and 20. The collar 122 is adapted to fit about the pole 112 and is split at 123. A bolt 121, as shown in FIG. 17, is used to tighten the collar 122 about the pole once the jaw is in the desired position. The base 124 has a flat lower surface 125 and a tapered upper surface 126. The upper surface is open as depicted in FIG. 15 and has a hole 127 shown in FIG. 18 that may receive a screw (not shown) or the like for securing the upper jaw to the rail 114 once it is in place. FIG. 20 shows the surface 125 with a series of nubs 128 arranged in a square matrix. The nubs 128 may be integrally formed with the lower flat surface 125 or may be attached to that surface. The nubs 125 are preferably of a somewhat rigid material so as to firmly grasp the rail surface.

Figure 21:
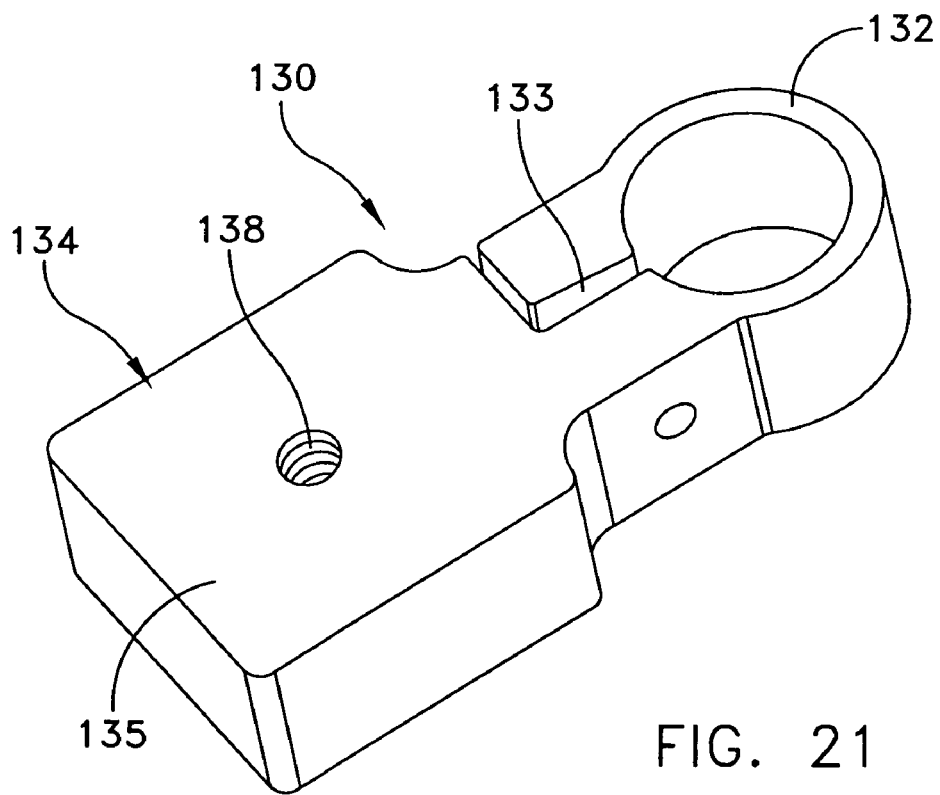
FIG. 21 is a perspective view of the underside of the lower jaw of the clamp member.
Figure 22:
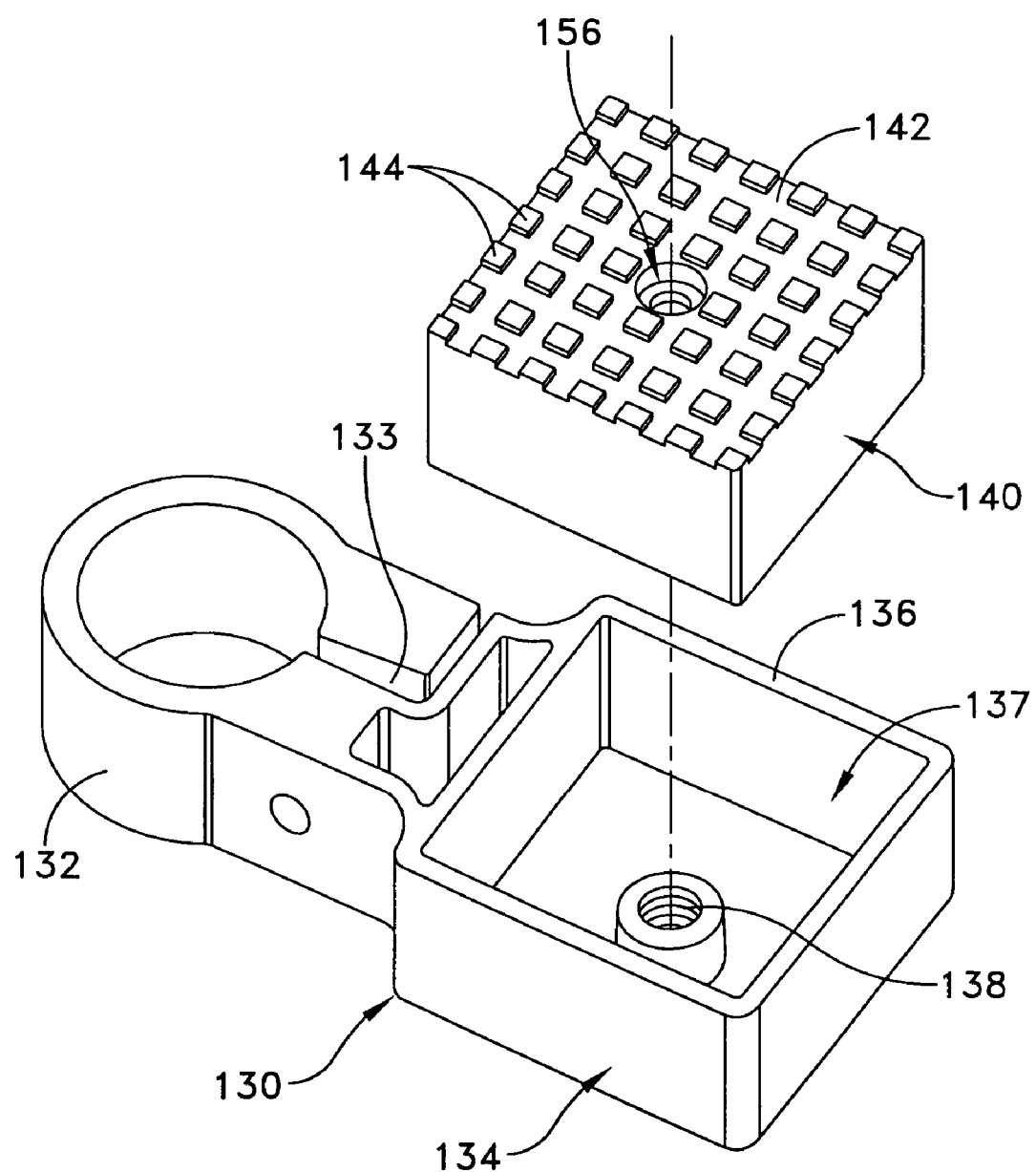
FIG. 22 is an exploded perspective view of the lower jaw of the clamp member.

The lower jaw 130 includes a collar 132 and a base 134, such as is depicted in FIGS. 15, 21 and 22. The collar 132 is adapted to fit about the pole 112 and is split at 133. A bolt 131, as shown in FIG. 17, is used to tighten the collar 132 about the pole once the jaw is in the desired position. The base 134 has a flat lower surface 135 and a flat upper peripheral surface 136. The upper peripheral surface 136 defines an open chamber 137 as depicted in FIG. 22 and has a hole 138 shown in FIGS. 21 and 22 that receives the top end of the hook member 160. FIG. 22 also shows the separate securing block 140 that is adapted to fit within the chamber 137. The block 140 has its surface 142 provided with a series of nubs 144 arranged in a square matrix. The nubs 144 may be integrally formed with the flat surface 142 or may be attached to that surface. The nubs 144 are preferably of a somewhat rigid material so as to firmly grasp the rail surface. By rotating the hook member 160 one can force the block 140 firmly against the underside of the rail.

Figure 19:
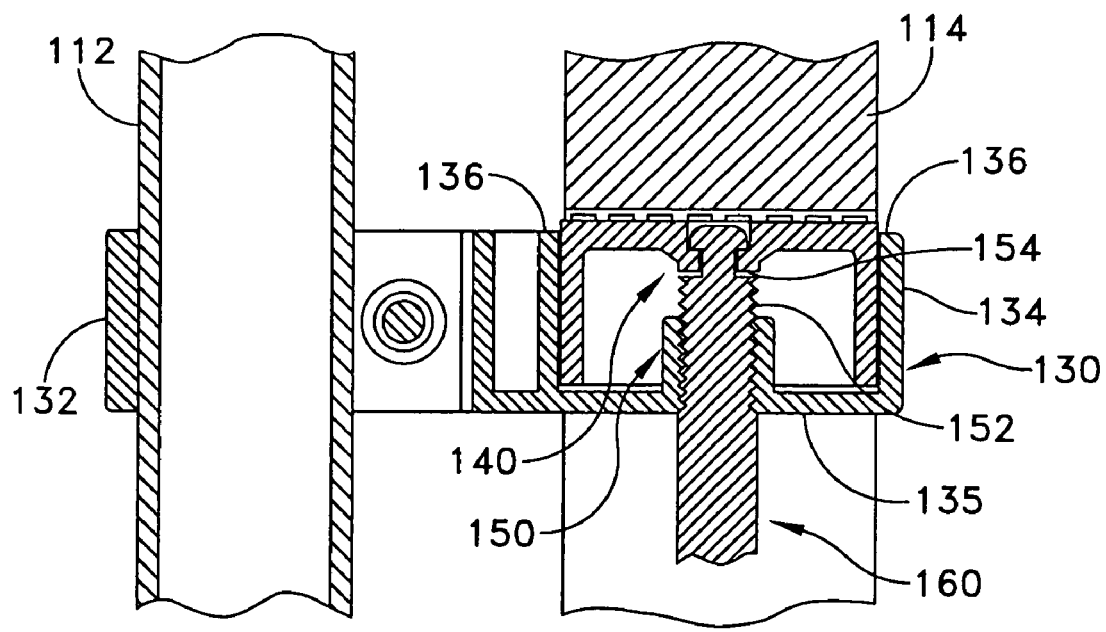
FIG. 19 is a cross-sectional view as taken along line 19-19 of FIG. 17 view showing further details.

The cross-sectional view of FIG. 19 illustrates the manner in which the hook member 160 is engaged with the block 140. The base 134 has an internal flange 150 that is internally threaded for receiving the threaded end 152 of the hook member 160. The block 140 is provided with a top passage 156, illustrated in FIG. 22, that receives the very top end of the hook member 160. The top end of the hook member 160 is smaller than the rest of the shaft so as to form a shoulder 154 that can be urged against the inside surface of the block 140 so as to secure the block 140 to the rail 114. The top end of the hook member 160 may be secured by peening over the very top end of the shaft so as to interlock the member 160 with the block 140. Alternatively, a small screw may be used passing through the hole 156 and secured into the top end of the hook member shaft. Once the jaw members are in place, the hook member 160 may be rotated. This causes a rotation of the hook member within the base 134. This action further forces the block member 140 upwardly, as viewed in FIG. 19. This action, in turn, forces the upper surface 142 of the block member into firm contact with the rail.

Having now described a limited number of embodiments of the present invention, it should now become apparent to one skilled in the art that numerous other embodiments and modifications thereof are contemplated as falling within the scope of the present invention as defined by the appended claims. For example, the latch member has been illustrated with three fingers, however, an alternate embodiment may employ fewer or greater number of fingers. Fewer or greater numbers of extensions may also be provided. Also, in the disclosed embodiments the base member is secured with a ridge of a port assembly. In an alternate embodiment where there is no perch provided at the base of the feeder, the base assembly may then engage with a ridge means properly supported from the container. Furthermore, such as depicted in FIG. 1, port assemblies may be provided at upper locations of the container and in that case the insert member need not use an engaging ridge.

Moreover, various other types of support attachments may be used other than the illustrated bale wire. Also, although substantially vertically disposed cylindrical feed containers have been illustrated, it is understood that the principles of the present invention also apply to containers of various other shapes, configurations and orientations including horizontal and vertical orientations.

What is claimed is:

1. A bird feeder comprising:
a bird feed holder having open top and bottom ends;
a plurality of feeding ports disposed in a sidewall defining the holder;
a plurality of perches each respectively associated with a feeding port;
a removable base for engaging with the bottom end of the holder, the removable base having a sealed position for sealing the bottom end of the holder and a released position in which the base is removed from the holder to enable access to the bottom end of the holder; and
a manually operated latch member supported by said base;
said manually operated latch member being supported for engagement with said removable base so as to enable releasable securing of the removable base to the holder;
said latch member further including means for supporting the latch member from the base including at least one latch extension for releasable engagement with a hole in a top wall of the base.

2. A bird feeder as claimed in claim 1 wherein said open top end has a cover to seal the top end.

3. A bird feeder as claimed in claim 1 wherein said bottom end is removably sealed to the removable base.

4. A bird feeder as claimed in claim 1 wherein said plurality of perches is independently supported on the holder and includes a dual perch to accommodate various size birds.

5. A bird feeder as claimed in claim 1 wherein said latch member radially engages with the holder.

6. A bird feeder as claimed in claim 1 including a plurality of latch extensions symmetrically disposed about the latch member for respective engagement with symmetrically disposed slots.

7. A bird feeder as claimed in claim 6 wherein each latch extension has an engaging end lip.

8. A bird feeder comprising:
a container for bird feed;
at least one feed port assembly;
said container including a walled member having at least one opening for receiving said feed port assembly;
said feed port assembly including a port member that supports a perch for holding a bird, an insert member having a slot for engagement with the walled member at the at least one opening and a fastener for securing the port member with the insert member so that the feed port assembly is fixed to the container.

9. A bird feeder as claimed in claim 8 including a plurality of feed port assemblies, wherein said feed port assemblies are disposed at random locations on the container.

10. A bird feeder as claimed in claim 8 wherein said perch is arcuate in shape.

11. A bird feeder as claimed in claim 8 wherein said container has a removable base.

12. A bird feeder as claimed in claim 11 wherein said perch is arcuate in shape with opposed legs and said removable base has respective notches for receiving said legs.

13. A bird feeder as claimed in claim 8 wherein said port member has a hood for preventing the outflow of bird feed.

14. A bird feeder comprising:
a container for bird feed;
at least one feed port assembly;
said container including a walled member having at least one opening for receiving said feed port assembly;
said feed port assembly including a port member, an insert member for engagement with the walled member at the at least one opening and a fastener for securing the port member with the insert member so that the feed port assembly is fixed to the container;
said insert member has a slot for engagement with said walled member at the at least one opening.

15. A bird feeder as claimed in claim 14 wherein said port member and insert member have respective interlocking cooperative surfaces preventing relative rotation therebetween.

16. A bird feeder comprising:
a container for bird feed;
at least one feed port assembly;
said container including a walled member having at least one opening for receiving said feed port assembly;
said feed port assembly including a port member, an insert member for engagement with the walled member at the at least one opening and a fastener for securing the port member with the insert member so that the feed port assembly is fixed to the container;
said port member and insert member have respective interlocking cooperative surfaces preventing relative rotation therebetween;
said respective interlocking cooperative surfaces comprise a groove and tongue arrangement.

17. A bird feeder as claimed in claim 14 wherein said container has a removable base and said feed port assembly has a hood and a perch.

18. A bird feeder comprising:
a container for bird feed;
at least one feed port assembly;
said container including a walled member having at least one opening for receiving said feed port assembly;
said feed port assembly including a port member, an insert member for engagement with the walled member at the at least one opening and a fastener for securing the port member with the insert member so that the feed port assembly is fixed to the container;
said container has a removable base and said feed port assembly has a hood and a perch;
said perch is arcuate in shape with opposed legs and said removable base has respective notches for receiving said legs.

19. A bird feeder comprising:
a container for bird feed;
at least one feed port assembly;
said container including a walled member having at least one opening for receiving said feed port assembly;
said feed port assembly including a port member, an insert member for engagement with the walled member at the at least one opening and a fastener for securing the port member with the insert member so that the feed port assembly is fixed to the container;
said port member includes an outer collar and an inwardly directed hood, said fastener extending through said collar for secure engagement with said insert member.

20. A bird feeder as claimed in claim 1 wherein said latch member also includes at least one latch finger that is manually compressable to release the removable base.

21. A bird feeder as claimed in claim 20 including a plurality of circumferentially disposed latch fingers integrally formed with a latch extension.

22. A bird feeder as claimed in claim 21 wherein each latch member includes an end lip.

23. A bird feeder as claimed in claim 22 wherein said bird feed holder comprises a plurality of circumferentially disposed ridge projections, said respective ridge projections engaged by said end lips.

24. A bird feeder as claimed in claim 8 wherein said insert member includes a perch.

25. A bird feeder as claimed in claim 8 including a removable base for the container that includes a base member and a latch member.

26. A bird feeder comprising:
a bird feed holder having open top and bottom ends;
at least one feeding port disposed in a sidewall defining the holder;
at least one perch associated with an inlet of the at least one feeding port;
a removable base for engaging with the bottom end of the holder, the removable base having a closed position for sealing the bottom end of the holder so as to retain the bird feed therein and an open position in which the base is removed from the holder to enable access to the bottom end of the holder; and
a manually operated latch member supported by said base;
said manually operated latch member including a center support having means for mounting the latch member from the base, and a plurality of compressable latch fingers that are circumferentially disposed about the center support and each include an engagement lip; and
a plurality of ridge projections that are circumferentially disposed and each supported by the bird feed holder;
each ridge projection extending radially inward of the bird feed holder and for releasable locking engagement with a respective engagement lip of the latch finger.

27. A bird feeder as claimed in claim 26, including a plurality of feeding ports and plurality of perches and wherein each feeding port comprises a port member having the perch integrally formed therewith.

28. A bird feeder as claimed in claim 27, wherein the ridge projection is formed as part of the port member.

29. A bird feeder as claimed in claim 26 wherein each latch member also includes a latch extension for engagement with the base.

30. A bird feeder as claimed in claim 26 wherein each latch finger is depressable radially so as to disengage it from a projection.

31. A bird feeder as claimed in claim 26 including a stop over each projection.

32. A bird feeder as claimed in claim 26 wherein the feed port includes a port member and an insert member having a slot for engagement with a wall of the holder and a fastener for securing the port member with the insert member so that the feed port is fixed to the holder.

* * * * *